United States Patent
Bozsik

(10) Patent No.: US 10,940,867 B2
(45) Date of Patent: Mar. 9, 2021

(54) SUBSTITUTION OF SENSOR MEASUREMENT DATA

(71) Applicant: Robert Bosch GmbH, Stuttgart (DE)

(72) Inventor: Richard Bozsik, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 369 days.

(21) Appl. No.: 15/766,867

(22) PCT Filed: Aug. 17, 2016

(86) PCT No.: PCT/EP2016/069486
§ 371 (c)(1),
(2) Date: Apr. 9, 2018

(87) PCT Pub. No.: WO2017/067687
PCT Pub. Date: Apr. 27, 2017

(65) Prior Publication Data
US 2018/0297609 A1    Oct. 18, 2018

(30) Foreign Application Priority Data

Oct. 20, 2015 (DE) ............ 10 2015 220 355.7

(51) Int. Cl.
*B60W 50/023* (2012.01)
*G05D 1/00* (2006.01)
(Continued)

(52) U.S. Cl.
CPC ...... *B60W 50/023* (2013.01); *B60W 50/0205* (2013.01); *B60W 50/029* (2013.01);
(Continued)

(58) Field of Classification Search
CPC .......... B60W 50/0205; B60W 50/029; B60W 50/023; G05D 1/0077; B60R 1/00;
(Continued)

(56) References Cited

U.S. PATENT DOCUMENTS 5,617,085 A * 4/1997 Tsutsumi ........... G06K 9/00805
340/903
6,169,478 B1 * 1/2001 Hada .................... G01S 13/931
340/435
(Continued)

FOREIGN PATENT DOCUMENTS

CN 102975717 A 3/2013
DE 102005057251 A1 6/2007
(Continued)

OTHER PUBLICATIONS

International Search Report dated Oct. 20, 2016, of the corresponding International Application PCT/EP2016/069486 filed Aug. 17, 2016.

*Primary Examiner* — Ramsey Refai
(74) *Attorney, Agent, or Firm* — Norton Rose Fulbright US LLP; Gerard Messina

(57) ABSTRACT

A method for operating a highly or fully automated vehicle equipped with a plurality of driving functions and at least two, at least partially redundant sensors recording measurement data. In this method, the sensors are checked for their operativeness. The measurement data of the at least two, at least partially redundant sensors are based on different measuring principles, and at least one driving function is modified and/or deactivated as a function of the operativeness of the sensors.

12 Claims, 2 Drawing Sheets

(51) Int. Cl.
*B60W 50/02* (2012.01)
*B60W 50/029* (2012.01)

(52) U.S. Cl.
CPC ... *G05D 1/0077* (2013.01); *B60W 2050/0215* (2013.01); *B60W 2050/0292* (2013.01); *G05D 2201/0213* (2013.01)

(58) Field of Classification Search
CPC ............ B60K 35/00; G01C 21/3673; G01C 21/3647; G06K 9/00671; G06K 9/00791; G06T 17/05
See application file for complete search history.

(56) References Cited

U.S. PATENT DOCUMENTS

| | | | | |
|---|---|---|---|---|
| 6,530,597 B1* | 3/2003 | Nesper | ............ | B60R 21/01 280/735 |
| 6,792,363 B1* | 9/2004 | Bye | ............ | G05D 1/0005 701/2 |
| 7,400,236 B2* | 7/2008 | Kade | ............ | B60W 50/14 340/463 |
| 9,081,653 B2* | 7/2015 | Ricci | ............ | G06F 17/00 |
| 9,188,980 B2* | 11/2015 | Anderson | ............ | G05D 1/0077 |
| 2004/0164851 A1* | 8/2004 | Crawshaw | ............ | B60Q 9/008 340/435 |
| 2005/0102096 A1* | 5/2005 | Min | ............ | G08G 1/0969 701/533 |
| 2009/0010502 A1* | 1/2009 | Hackbarth | ............ | B60N 2/0248 382/124 |
| 2009/0146846 A1* | 6/2009 | Grossman | ............ | G06F 3/0482 340/988 |
| 2011/0166746 A1* | 7/2011 | Breuer | ............ | B60T 7/22 701/29.2 |
| 2012/0221168 A1* | 8/2012 | Zeng | ............ | B60W 30/16 701/1 |
| 2015/0051778 A1 | 2/2015 | Mueller | | |
| 2015/0120144 A1 | 4/2015 | De Bruin et al. | | |
| 2016/0103450 A1* | 4/2016 | Hogenmueller | ...... | B60W 30/00 701/23 |
| 2017/0053537 A1* | 2/2017 | Manley | ............ | G08G 5/0069 |

FOREIGN PATENT DOCUMENTS

| | | |
|---|---|---|
| DE | 102010021591 A1 | 12/2011 |
| DE | 102011015130 A1 | 12/2011 |
| DE | 102012008090 A1 | 10/2013 |
| DE | 102013020177 A1 | 6/2014 |
| EP | 2921362 A1 | 9/2015 |
| JP | 2011210095 A | 10/2011 |
| JP | 2014213690 A | 11/2014 |
| KR | 101470190 B1 | 12/2014 |
| WO | 2015124379 A1 | 8/2015 |

* cited by examiner

SUBSTITUTION OF SENSOR MEASUREMENT DATA

FIELD

The present invention relates to a method, an apparatus and a computer program for operating a highly or fully automated vehicle.

BACKGROUND INFORMATION

German Patent Application No. DE 10 2011 015 130 A1 describes a method for ensuring operation of a vehicle capable of driving autonomously with limited capabilities, which includes the following steps: Monitoring a plurality of specific conditions which are necessary for preferred and reliable utilization of autonomous driving with limited capabilities, and initiating a strategy for handling and reducing errors, the strategy being established to maneuver the vehicle into a preferred state in the event the driver is not able to control the vehicle manually, if at least one of the specific conditions either is or will be violated.

German Patent Application No. DE 10 2012 008 090 A1 describes a method and an emergency-stop assist, respectively, for executing a safeguarded emergency-stop maneuver of a moving motor vehicle. In this case, the driver is monitored, and driver-condition data are generated, from which the degree of fitness to drive is determined. The vehicle is subsequently transferred into an automatic driving mode if the degree of fitness of the driver to drive drops below a predetermined threshold value, and a safeguarded emergency-stop maneuver is implemented. In this context, a risk-minimalistic stopping position is determined for the emergency stop of the vehicle from predictive route data of the future route of the vehicle, and this stopping position is approached using the automatic driving mode, the safeguarded emergency-stop maneuver being executed.

SUMMARY

In accordance with the present invention, an example method is provided for operating a highly or fully automated vehicle equipped with a plurality of driving functions and at least two, at least partially redundant sensors recording measurement data. In this method, the sensors are checked for their operativeness. The essence of the invention lies in the fact that the measurement data of the at least two, at least partially redundant sensors are based on different measuring principles, and that at least one driving function is modified and/or deactivated as a function of the operativeness of the sensors.

This present invention may offer an advantage that the vehicle has at least partially redundant sensors, which are based on different measuring principles. Consequently, safety may be increased, since incorrect information or measuring errors subject to measuring principles are able to be recognized. A measuring principle is understood to be the scientific/physical basis of a measuring method. For example, imaging sensors, radar sensors, lidar sensors or ultrasonic sensors may be used to generate measurement data which represent a distance or from which a distance may be derived. The measurement of the data with the sensors utilized is in each case based on different measuring principles.

A further advantage of the present invention is that the sensors employed may each have separate primary tasks, for which the underlying measuring principle is best suited. Thus, for example, pedestrians may be detected better with a camera than with a radar sensor, whereas distances to preceding vehicles are measurable more effectively with a radar sensor. Since the sensors are not used solely for redundancy, costs and space required may be reduced.

By checking the sensors for their operativeness, system faults or curtailments may be detected quickly, and individual driving functions may be modified and/or deactivated as a function of the operativeness. First of all, safety is thus increased, and secondly, traffic flow may be improved, since instead of being deactivated, driver-assist functions may also be modified, and vehicles may thereby be prevented from breaking down.

Driving functions may be understood to be all driving activities and/or control maneuvers executable in the vehicle by a driver or by a present-day vehicle. In this context, a driving function may be made up of various subfunctions. Thus, for example, a passing function, which is able to analyze and assess the surrounding traffic and the current traffic situation and to execute a suitable driving maneuver based on the assessment, may have a plurality of subfunctions. For instance, a subfunction for steering to the left or to the right or a subfunction for accelerating the vehicle or a comparable maneuver. The corresponding monitoring of the traffic may also form a subfunction. These subfunctions taken by themselves are also again driving functions. A comparable division is possible for all further familiar driving functions like, for example, an automatic distance-keeping function, lane-keeping function, emergency-braking function, pedestrian-detection function, cyclist-detection function, a traffic-crossing assist, a traffic-sign recognition or a construction-site assist function, this list not being exhaustive.

In one advantageous implementation of the present invention, the measurement data of an at least partially redundant sensor are substituted for the measurement data of a curtailed or non-operative sensor.

This specific embodiment offers the advantage that in the case of a non-operative or only partially operative sensor, the measurement data of an at least partially redundant sensor may be used. Since the measurements of the sensors are based on different measuring principles, the likelihood of a fault that is systematic and/or inherent in the measuring principle decreases.

In a further specific embodiment of the method in accordance with the present invention, the substituted measurement data are used to modify the at least one driving function.

This specific embodiment offers the advantage that instead of deactivating a driving function, it may be modified. Even in the case of sensors which are only partially operative or are non-operative, driving functions may continue to be maintained with the aid of the substituted measurement data.

In one advantageous specific embodiment of the present invention, the vehicle features a route-based navigation. In this method, a route to a pre-definable destination is calculated on the basis of the operativeness of the sensors and/or the at least one modified and/or deactivated driving function. In this case, it is specifically provided that the route is recalculated in reaction to a change in the operativeness of at least one sensor determined by the checking process.

This specific embodiment of the method offers the advantage that the route to a pre-definable destination may be adjusted as a function of the operativeness of the sensors and/or the at least one modified and/or deactivated driving function. If a driving function has been modified, e.g., because of a sensor defect, and therefore no longer has its full functional scope, this may then be taken into account in the route planning accordingly, and the route is recalculated based on this curtailment. If individual driving functions must be deactivated completely due to a sensor failure, it is possible to react appropriately to this situation by recalculating the route. All in all, safety of the vehicle occupants thereby increases, and a better flow of traffic may be ensured. If individual driving functions have already been modified and/or deactivated prior to the input of a destination, a route adapted to the new functional scope may be calculated directly upon input of a destination.

In one advantageous specific embodiment of the method, a new destination is determined on the basis of the operativeness of the sensors and/or the at least one modified and/or deactivated driving function.

If, in the case of partially operative or non-operative sensors, driving functions must be deactivated or modified, and as a result, it is no longer possible to reach an originally planned destination, in this advantageous specific embodiment of the method, the destination may be recalculated. In addition, safety may be increased by this function if, in the case of a fault or a curtailment, to be on the safe side, a new destination is selected that is faster and/or easier to reach. In ascertaining the destination, it should be taken into account that the destination is reachable with the unmodified and/or non deactivated and the modified driving functions.

In a further specific embodiment of the method, measurement data recorded by the sensors and stored in the vehicle are used for determining the new destination.

This specific embodiment offers the advantage that in addition to and/or as an alternative to customary methods for determining a destination, the measurement data recorded by the sensors and stored in the vehicle may also be used to ascertain the new destination. In this way, parking spaces or free areas which the vehicle has already passed and which were recorded by the sensors qualify as additional possible destinations. For example, if sensors fail without which safe forward driving can no longer be ensured, the vehicle is then possibly able to back up into a parking space detected previously by the sensors or into another safe area which was recorded by the sensors.

In one advantageous specific embodiment of the method, an automatic parking maneuver is executed at the newly determined destination. This advantageously ensures that the vehicle is parked safely at the newly ascertained destination.

In a further specific embodiment of the method, a warning signal is generated for an occupant of the vehicle if at least one sensor is assessed as curtailed and/or non-operative and/or at least one driving function is modified or deactivated.

This specific embodiment offers the advantage that a driver of the vehicle is made aware directly of a case of error and/or a functional impairment/curtailment of the system. The driver therefore has the possibility of reacting appropriately to this situation by, for example, assuming the driving control himself or giving instructions to the vehicle. Safety may be further increased by the warning signal to the driver.

In a further specific embodiment of the method, a probability value is used for ascertaining the new destination, the probability value being calculated from a probability of a collision with other road users and/or a hindrance of other road users at the new destination.

This specific embodiment advantageously aids in selecting the safest possible new destination and reducing the probability for hindrances of other road users or accidents. For example, to calculate the probability value, data from accident research may be used, with which statistics are able to be generated about accident probabilities at different stopping positions/destinations.

In addition, according to the present invention, an apparatus is provided for operating a highly or fully automated vehicle equipped with a plurality of driving functions and at least two, at least partially redundant sensors recording measurement data. According to the invention, the measurement data of the at least two, at least partially redundant sensors are based on different measuring principles. Moreover, the apparatus is equipped to carry out the method according to the present invention.

One advantageous specific embodiment of the apparatus additionally features a route-based navigation, so that all method steps of the method according to the present invention are able to be carried out.

In addition, in accordance with the present invention, a computer program is disclosed which is equipped to execute all steps of the method according to the invention.

Further particulars, features, feature combinations, advantages and effects based on the present invention are derived from the description below of the preferred embodiments of the present invention and from the figures.

DETAILED DESCRIPTION OF EXAMPLE EMBODIMENTS

Figure 1:
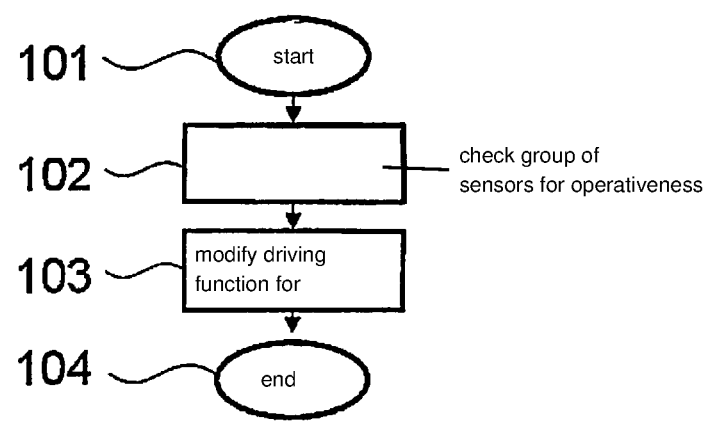
FIG. 1 shows a schematic flow chart of an exemplary method.

FIG. 1 shows an exemplary embodiment of an example method in accordance with the present invention in a vehicle. The vehicle is equipped here with a corresponding apparatus, on which a computer program is set up in order to carry out the method. In addition, the vehicle is equipped with two at least partially redundant sensors recording measurement data, the generation of the measurement data by the sensors being based in each case on different measuring principles. In this example, the distance to objects in front of the vehicle is determined by a radar sensor. In addition, a mono camera is mounted, which covers a viewing and/or measuring range overlapping with the radar sensor. Distances are able to be determined both with the radar sensor and with the mono camera with the aid of different measuring principles. The vehicle is also equipped with driving functions which utilize data from the radar sensor and/or data of the mono camera.

The method starts in step 101. In step 102, at least one defined group of sensors with which the vehicle is furnished is checked for its operativeness. For instance, for this purpose, error messages from individual sensors or subsystems which receive data from the sensors may be acquired as input signal, and the operativeness of the sensors may be derived from these signals. Logic operations are also conceivable in which, for example, the combination of signals of certain sensors or subsystems points to faults of other sensors. In this exemplary embodiment, sensors used by the vehicle are checked which are utilized in at least one driving function implemented in the vehicle. In particular, the mono camera and the radar sensor are checked.

If in checking the sensors, it is determined that a sensor is only curtailed or is non-operative, then in step 103, a driving function for which the curtailed or non-operative sensor is supposed to supply measurement data is modified. In this exemplary embodiment, a function for determining the distance to a preceding vehicle is designed in such a way that it uses primarily the data of the radar sensor for detecting distance. If checking shows that this radar sensor is no longer operative, then the measurement data of the mono camera may be utilized instead of the measurement data of the radar sensor. Since determining the distance with the aid of the measurement data of the mono camera is possibly more time-consuming than determining the distance using the measurement data of the radar sensor, the function for determining the distance to a preceding vehicle suffers a loss in performance. As a result, this function may be modified in such a way, for instance, that because the radar sensor is non-operative, a greater collision-avoidance distance is automatically maintained. Owing to the modification of the driving function, the vehicle may continue to be guided in automated fashion without necessarily initiating an emergency maneuver or handing over the control to a driver.

The method ends in step 104.

Figure 2:
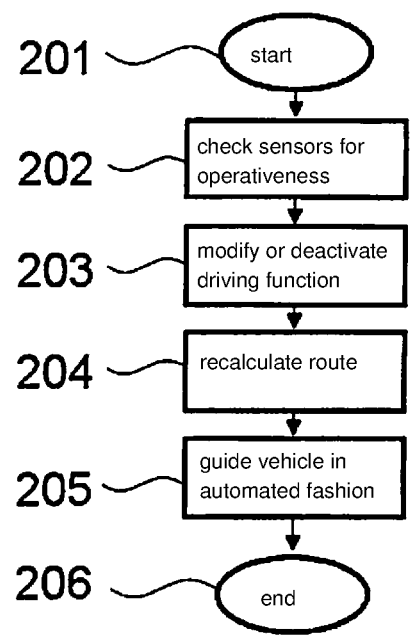
FIG. 2 shows a further schematic flow chart of an exemplary method.

FIG. 2 depicts a further exemplary flow chart of an example method in accordance with the present invention. The vehicle is again equipped with an apparatus and a computer program set up on the apparatus for carrying out the method, and with a route-based navigation. To monitor the left side of the vehicle, a camera is mounted whose measurement data are used for a turning function and a passing function, and which make it possible to determine distances to vehicles and other objects. In addition, the left side of the vehicle is equipped with an ultrasonic array made up of a plurality of ultrasonic sensors, with which distances are likewise able to be measured. Because of the different measuring principles of the sensors, they cover different distances to the vehicle, but share a certain monitoring range.

The method starts in step 201. In step 202, sensors present in the vehicle are again checked for their operativeness, especially the camera and the ultrasonic sensors.

If it is determined in step 202 that a sensor is not or is only partially operative, in step 203, a driving function for which the sensor is supposed to supply measurement data is modified or, if necessary, deactivated. For example, if it is determined that the camera is no longer operative, the passing function and turning function are modified. To avoid having to deactivate the functions completely, the measurement data of the camera are replaced by the measurement data of the operative ultrasonic array. Because the range of the ultrasonic sensors is smaller, the corresponding driving functions are curtailed, so that driving maneuvers controlled or monitored by them may be carried out only at low speeds, for example. If both the camera and the ultrasonic array fail, for instance, and no further measurement data are available that make it possible to at least maintain a function to a limited extent, corresponding driving functions are completely deactivated.

In view of the driving functions modified and curtailed in this example, in step 204, the route is recalculated with the aid of the route-based navigation. Since the operativeness of the turning function is curtailed, a route is selected which necessitates the fewest possible turning or lane-change maneuvers to the left side or left lane. If already prior to the input of a destination, a sensor is assessed as partially curtailed or non-operative, or if a driving function was already curtailed, this information is then included accordingly in the first planning of the route.

If it turns out that because of curtailments of the operativeness of sensors or because of modified or deactivated driving functions, a destination cannot be reached or can be reached only with increased risk of accident, which may be calculated based on the route and the modified or deactivated driving function(s), instead of recalculating the route in step 204, a new destination may also be selected and a corresponding route to this new destination.

After both the destination and the route have been determined in step 204, in step 205, the vehicle is guided in automated fashion to this destination and an automatic parking maneuver is executed at the destination.

The method ends in step 206.

In a further exemplary embodiment, sensors fail which supply essential measurement data for driving functions that permit a forward movement of the vehicle. In this event, the corresponding driving functions must be deactivated, so that it is no longer possible to continue driving forward. In this case, a new destination is determined, which is reachable with the remaining driving functions. In addition to customary methods for determining destinations such as navigation data, map material and current sensor measurement data, measurement data recorded by sensors and stored in the vehicle are also used for this purpose. For example, if shortly before the failure, the vehicle has passed a parking space or a suitable location for parking the vehicle which is no longer able to be detected by the sensors at the instant of the failure, e.g., because of visibility obstructions, the recorded measurement data may be utilized for determining a new destination. Since the driving functions for driving in reverse are not affected by the failure of the sensors, it is possible to head for a destination by driving in reverse, and a parking maneuver may be executed at this destination.

In a further exemplary embodiment, all sensors essential for automated driving fail. In this case, an immediate emergency-stop maneuver may be carried out. If the traffic conditions allow, as an alternative, with the aid of the measurement data recorded prior to the failure of the sensors, a new destination may be ascertained, e.g., a breakdown lane, which may be approached based on the recorded measurement data. This maneuver is to be executed in a time window in which it may be ensured that the situation has not changed in such a way that such a maneuver is no longer feasible. For example, the possibility that pedestrians could linger at the newly ascertained destination before a parking maneuver/emergency stop is able to be carried out by the vehicle at this position should be ruled out.

In all exemplary embodiments cited, in the event a sensor is assessed as being non-operative or only partially operative, it is possible to output a warning signal to a driver, e.g., with a corresponding indication as to which sensor is involved and which driving function is or could thereby be affected. Warnings may also only be output if driving functions are modified. Alternatively, warnings may also only be output when functions are curtailed by the modification or must be deactivated completely.

In the exemplary embodiments, for the most part, sensors are named which are able to sense distances and objects, like ultrasonic sensors, lidar sensors, radar sensors, mono cameras and stereo camera sensors. However, the present invention is not limited to such visual sensors or the measurement of distances. All current sensor concepts which are used for driver assistance functions are encompassed in this application, including all types of acceleration sensors, RPM sensors, pitch sensors, roll sensors and yaw-rate sensors, as well.

What is claimed is:

1. A method for operating a highly or fully automated vehicle, the method comprising:
   checking at least two, at least partially redundant sensors recording measurement data sensors for operativeness, wherein the highly or fully automated vehicle includes a plurality of driving functions and the at least two, at least partially redundant sensors recording measurement data, and wherein the measurement data of the at least two, at least partially redundant sensors are based on different measuring principles; and
   modifying at least one driving function as a function of the operativeness of the sensors;
   wherein error messages from the at least two, at least partially redundant sensors or subsystems which receive data from the redundant sensors are acquired as input signals, and the operativeness of the redundant are derived from the input signals,
   wherein the modifying of the driving function includes maintaining a greater collision-avoidance distance, and
   wherein if no further measurement data are available to at least maintain at least a limited driving function, the driving function is deactivated.

2. The method as recited in claim 1, wherein measurement data of an at least partially redundant sensor of the sensors are substituted for measurement data of a curtailed or non-operative sensor of the sensors.

3. The method as recited in claim 2, wherein the substituted measurement data are used to modify the at least one driving function.

4. The method as recited in claim 1, wherein the vehicle includes a route-based navigation, the method further comprising:
   at least one of: (i) calculating a route to a pre-definable destination on the basis of the operativeness of the sensors, and (ii) recalculating the route in reaction to a change in the operativeness of at least one sensor determined by the checking.

5. The method as recited in claim 4, wherein a new destination is determined based on at least one of the operativeness of the sensors, and the at least one modified or deactivated driving function.

6. The method as recited in claim 5, wherein measurement data recorded by the sensors and stored in the vehicle are used for determining the new destination.

7. The method as recited in claim 5, wherein an automatic parking maneuver is executed at the newly calculated destination.

8. The method as recited in claim 1, further comprising:
   generating a warning signal for an occupant of the vehicle when at least one of: (i) at least one sensor is assessed as curtailed or non-operative, and (ii) at least one driving function is modified or deactivated.

9. The method as recited in claim 4, wherein a probability value is used for ascertaining the new destination, the probability value being calculated based on at least one of: (i) a probability of a collision with other road users, and (ii) a hindrance of other road users at the new destination.

10. An apparatus for operating a highly or fully automated vehicle, comprising:
    a device configured to perform the following:
       checking at least two, at least partially redundant sensors recording measurement data sensors for operativeness, wherein the highly or fully automated vehicle includes a plurality of driving functions and the at least two, at least partially redundant sensors recording measurement data, and wherein the measurement data of the at least two, at least partially redundant sensors are based on different measuring principles; and
       modifying at least one driving function as a function of the operativeness of the sensors;
       wherein error messages from the at least two, at least partially redundant sensors or subsystems which receive data from the redundant sensors are acquired as input signals, and the operativeness of the redundant are derived from the input signals,
       wherein the modifying of the driving function includes maintaining a greater collision-avoidance distance, and
       wherein if no further measurement data are available to at least maintain at least a limited driving function, the driving function is deactivated.

11. The apparatus as recited in claim 10, wherein the vehicle includes a route-based navigation, and wherein the apparatus is equipped to at least one of: (i) calculate a route to a pre-definable destination on the basis of the operativeness of the sensors, and (ii) recalculate the route in reaction to a change in the operativeness of at least one sensor determined by the checking.

12. A non-transitory computer-readable storage medium, on which is stored a computer program, which is executable by a processor, comprising:
    a program code arrangement having program code for operating a highly or fully automated vehicle equipped with a plurality of driving functions and at least two, at least partially redundant sensors recording measurement data, by performing the following:
       checking the sensors for operativeness, wherein the measurement data of the at least two, at least partially redundant sensors are based on different measuring principles; and
       modifying at least one driving function as a function of the operativeness of the sensors;
       wherein error messages from the at least two, at least partially redundant sensors or subsystems which receive data from the redundant sensors are acquired as input signals, and the operativeness of the redundant are derived from the input signals,
       wherein the modifying of the driving function includes maintaining a greater collision-avoidance distance, and
       wherein if no further measurement data are available to at least maintain at least a limited driving function, the driving function is deactivated.

* * * * *